(12) United States Patent
Manda

(10) Patent No.: US 7,412,301 B1
(45) Date of Patent: Aug. 12, 2008

(54) IDENTIFYING QUALITY MOLDED ARTICLE BASED ON DETERMINATION OF PLUG BLOW

(75) Inventor: Jan Marius Manda, Toronto (CA)

(73) Assignee: Husky Injection Molding Systems Ltd., Bolton, On (CA)

( * ) Notice: Subject to any disclaimer, the term of this patent is extended or adjusted under 35 U.S.C. 154(b) by 0 days.

(21) Appl. No.: 11/672,587

(22) Filed: Feb. 8, 2007

(51) Int. Cl.
*B29C 45/00* (2006.01)

(52) U.S. Cl. .................. 700/197; 700/201; 700/300; 264/40.6; 425/143

(58) Field of Classification Search .......... 700/110, 700/117, 197, 201, 202, 299, 300; 264/40.1, 264/40.6; 425/143, 144; 74/490.01, 479.01
See application file for complete search history.

(56) References Cited

U.S. PATENT DOCUMENTS

| | | | | |
|---|---|---|---|---|
| 6,007,229 A | * | 12/1999 | Parnell et al. | 700/115 |
| 6,502,009 B1 | * | 12/2002 | Parnell et al. | 700/200 |
| 6,529,796 B1 | * | 3/2003 | Kroeger et al. | 700/202 |
| 6,533,021 B1 | | 3/2003 | Shibata et al. | |
| 6,649,095 B2 | * | 11/2003 | Buja | 264/40.6 |
| 6,666,259 B2 | | 12/2003 | Shibata et al. | |
| 6,936,199 B2 | | 8/2005 | Olaru | |
| 6,938,669 B2 | | 9/2005 | Suzuki et al. | |
| 7,039,485 B2 | * | 5/2006 | Engelbart et al. | 700/110 |
| 7,216,005 B2 | * | 5/2007 | Shioiri et al. | 700/48 |
| 7,258,536 B2 | * | 8/2007 | Olaru et al. | 425/143 |
| 2003/0206991 A1 | | 11/2003 | Godwin et al. | |
| 2004/0032060 A1 | | 2/2004 | Yu | |
| 2007/0027566 A1 | * | 2/2007 | Weder | 700/110 |

* cited by examiner

*Primary Examiner*—Albert Decady
*Assistant Examiner*—Douglas S Lee

(57) ABSTRACT

Disclosed is: (i) a method of a molding system, (ii) a method of a controller of a molding system, (iii) a method of an article of manufacture of a controller of a molding system, (iv) a method of a network-transmittable signal of a controller of a molding system, (v) a method of a molding system having a controller, (vi) an article made by usage of a method. The method includes an operation of identifying quality of the molded article that was molded in a mold based on a determination of whether a plug blew, at least in part, from a melt passageway to the mold prior to a molding material entering the mold.

14 Claims, 5 Drawing Sheets

IDENTIFYING QUALITY MOLDED ARTICLE BASED ON DETERMINATION OF PLUG BLOW

RELATED APPLICATIONS

The following is a list of patent applications related to the instant application, in which the Applicant's references numbers corresponding to U.S. patent application Ser. Nos. 11/297,926, 11/347,302, 11/349,984 and U.S. patent application Ser. No. 11/502,945 respectively.

TECHNICAL FIELD

The present invention generally relates to, but is not limited to, molding systems and control mechanisms of molding systems, and more specifically the present invention relates to, but is not limited to, (i) a method of a molding system, (ii) a controller of a molding system, (iii) an article of manufacture of a controller of a molding system, (iv) a network-transmittable signal of a controller of a molding system, (v) a molding system having a controller, (vi) a modeled article manufactured by a method.

BACKGROUND

Examples of known molding systems are (amongst others): (i) the HyPET™ Molding System, (ii) the Quadloc™ Molding System, (iii) the Hylectric™ Molding System, and (iv) the HyMet™ Molding System (which is a metal-molding system), all manufactured by Husky Injection Molding Systems (www.husky.ca).

U.S. patent application Ser. No. 2002/0189781 (Inventor: Shibata et al; Published: Jun. 19, 2002) discloses a method for manufacturing a mold of a metal hot-runner injection molding machine. The method includes: (i) measuring a temperature gradient of metal disposed in a nozzle between heating means of the nozzle and a tip of the nozzle, (ii) selecting an area in the nozzle based on the measurement of the temperature gradient such that the metal in the nozzle upon a mold opening has a temperature at which a solidified condition of the metal can be stably maintained, said temperature being close to a melting temperature of the metal, and (iii) determining a gate cut portion in the area.

U.S. Pat. No. 6,529,796 (Inventor: Kroeger et al; Published: Mar. 4, 2003) discloses an injection mold apparatus that has multiple injection zones, each zone having at least one heater and at least one temperature sensor generating a temperature indicating signal. A power source provides power to the heaters. A controller controls the temperature of at least some of the zones. For efficiency, the controller has two separate processors, a data-receiving processor for receiving temperature indicating signal from each sensor as well as power signals, and a control processor for receiving data from the data-receiving processor and for controlling the amount of power provided to the heaters. Preferably, the control is in a housing, with the housing mounted directly on the mold. Modified PID calculations are utilized. Power calculations for the amount of power to the heaters utilizes a modulo based algorithm.

U.S. patent application Ser. No. 2003/0206991 (Inventor: Godwin et al; Published: Nov. 6, 2003) discloses an improved mold manifold and hot runner nozzle using thin film elements include at least one active or passive thin film element disposed along a melt channel between the manifold inlet and the hot runner nozzle. Preferably, the thin film element may comprise a thin film heater in direct contact with the molten resin and position to aid in the heat and flow management of the resin within the melt channel. Thin film temperature sensors, pressure sensors, and leak detectors may also be provided in the vicinity of the melt channel to enhance process control in the injection molding machine.

U.S. Pat. No. 6,533,021 (Inventor: Shibata et al; Published: Mar. 18, 2003) discloses a mold for a metal hot-runner injection molding machine. The mold includes a movable mold plate, a fixed mold plate having a nozzle for injection molten metal into said cavity, and a heating device disposed outside the nozzle for heating metal. A gate cut portion is situated in the nozzle between the heating device and the tip. A temperature measurement device is arranged adjacent to the gate cut portion for measuring the temperature of the metal in the gate cut portion. A heating control device is connected to the heating device for controlling a temperature of the nozzle on a basis of the temperature measurement device. A heat insulation device is arranged on the nozzle to cover at least an area where the gate cut portion is formed. By controlling the temperature of the nozzle, metal injection molding without runner can be made.

U.S. Pat. No. 6,649,095 (Inventor: Buja; Published: Nov. 18, 2003) discloses a method and apparatus for controlling a mold flow process using inner (impinge) and/or edge temperature sensors, wherein articles processed in a constraining mold cavity, having a constant melt "shrink" quality, can be obtained even with fluctuations in resin "melt" properties (flowability). At least one temperature-dependent output or "trigger" signal is sampled, and the level of the signal (e.g., temperature) initiates at least one step in the molding cycle. Using a sampling circuit, thermal waveforms are obtained from thermal sensor array data such that if a sequence of melt temperature set-point trigger times fluctuates outside control limits, then the process melt-flow is judged as a hotter/faster melt-flow or cooler/slower melt-flow injection process.

U.S. Pat. No. 6,666,259 (Inventor: Shibata et al; Published: Dec. 23, 2003) discloses a method for manufacturing a mold of a metal hot-runner injection molding machines. The method includes: (i) disposing at least one temperature control target point, as a reference for a temperature control by heating means for heating a nozzle, between the heating means and a tip of the nozzle, (ii) controlling said heating means such that upon a mold opening, at least a portion of metal adjacent to the heating means becomes a molten state and that a temperature of said temperature control target point is kept at a constant level which is lower than a melting point of the metal, (iii) measuring a temperature gradient between the heating means and the tip of the nozzle when the temperature of the temperature control target point is kept constant, (iv) selecting an area in the nozzle based on the measurement of the temperature gradient such that the metal in the nozzle upon a mold opening has a temperature at which a solidified condition of the metal can be stably maintained, said temperature being close to a melting temperature of the metal, and (v) determining a gate cut portion in the area.

U.S. patent application Ser. No. 2004/0032060 (Inventor: Yu; Published: Feb. 19, 2004) discloses a method of controlling a shut-off nozzle for hot runner systems of injection molding machines, the shut-off nozzle heaving a heating unit and a cooling unit around a gate tip thereof. The method includes the steps of: (i) heating a nozzle body to a predetermined high temperature by turning on a heater which is provided in the nozzle body, (ii) heating the gate tip having a nozzle gate, by turning on the heating unit provided around the gate tip, (iii) injecting a molten resin into a cavity of a mold through the nozzle gate, (iv) turning off the heating unit, after an injection of a predetermined amount of the molten resin into the cavity of the mold is completed, thus allowing the gate tip to start to cool, (v) operating the cooling unit provided around the gate tip, thus quickly cooling the gate tip, and (vi) opening the mold to remote a molded product from the cavity of the mold.

U.S. Pat. No. 6,936,199 (Inventor: Olaru; Published: Aug. 30, 2005) discloses an injection molding apparatus that includes a manifold having a manifold channel for receiving a melt stream of molten material under pressure and delivering the melt stream to a nozzle channel of a nozzle. A mold cavity receives the melt stream from the nozzle and the nozzle channel communicates with the mold cavity through a mold gate. A thermocouple is coupled to the mold core of the mold cavity in order to measure the temperature of the molten material in the mold cavity.

U.S. Pat. No. 6,938,669 (Inventor: Suzuki et al; Published: Sep. 6, 2005) discloses a mold-clamping process in which the mold is closed and (i) the injection-pressure increase (solidifying) process, (ii) the gate-melting process for heating the hot runner to melt the plug (metallic material) of the gate, (iii) the mold-lubricant coating process for spraying the lubricant onto the wall surface of the cavity, and (iv) the material-metering process are simultaneously carried out in parallel to each other. Thus, the molding cycle time can be reduced to a great extent.

SUMMARY

According to a first aspect of the present invention, there is provided a method of a molding system, including: an operation of identifying quality of a molded article that was molded in a mold based on a determination of whether a plug blow, at least in part, from a melt passageway to the mold prior to a molding material entering the mold.

According to a second aspect of the present invention, there is provided a method of a controller of a molding system, the controller including: a controller-usable medium embodying instructions being executable by the controller, the controller configured to be operatively coupled to the molding system, the instructions including: executable instructions for directing the controller to perform an operation of identifying quality of a molded article that was molded in a mold based on a determination of whether a plug blew, at least in part, from a melt passageway to the mold prior to a molding material entering the mold.

According to a third aspect of the present invention, there is provided a method of an article of manufacture of a controller of a molding system, the article of manufacture including: a controller-usable medium embodying instructions executable by the controller, the controller operatively coupled to the molding system, the instructions including: executable instructions for directing the controller to perform an operation of identifying quality of a molded article that was molded in a mold based on a determination of whether a plug blew, at least in part, from a melt passageway to the mold prior to a molding material entering the mold.

According to a fourth aspect of the present invention, there is provided a method of a network-transmittable signal of a controller of a molding system, the network-transmittable signal including: a carrier signal modulated to carry instructions executable by a controller operatively coupled to the molding system, the instructions including: executable instructions for directing the controller to perform an operation of identifying quality of a molded article that was molded in a mold based on a determination of whether a plug blew, at least in part, from a melt passageway to the mold prior to a molding material entering the mold.

According to a fifth aspect of the present invention, there is provided a method of a molding system, including: a controller, including: a controller-usable medium embodying instructions being executable by the controller, the controller operatively coupled to the molding system, the instructions including: executable instructions for directing the controller to perform an operation of identifying quality of a molded article that was molded in a mold based on a determination of whether a plug blew, at least in part, from a melt passageway to the mold prior to a molding material entering the mold.

According to a sixth aspect of the present invention, there is provided an article manufactured by a method, the method including: an operation of identifying quality of the molded article that was molded in a mold based on a determination of whether a plug blew, at lest in part, from a melt passageway to the mold prior to a molding material entering the mold.

A technical effect, amongst other technical effects, of the aspects of the present invention is improved operation of a molding system. Preferable embodiments of the present invention are subject of the dependent claims.

DESCRIPTION OF THE DRAWINGS

A better understating of the exemplary embodiments of the present invention (including alternatives and/or variations thereof) may be obtained with reference to the detailed description of the exemplary embodiments of the present invention along with the following drawings, in which.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE EXEMPLARY EMBODIMENTS

Figure 1:
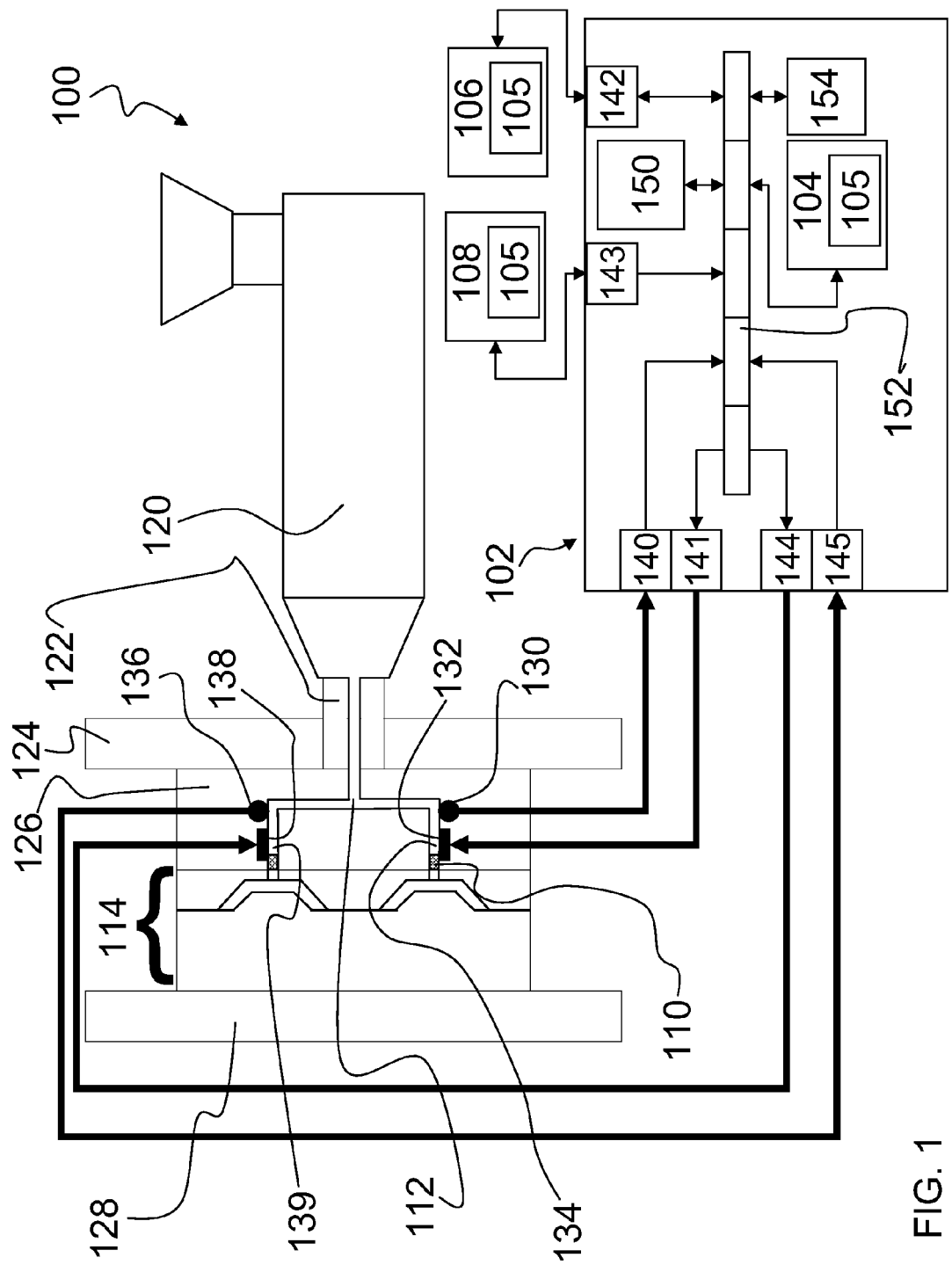
FIG. 1 is a schematic representation of a molding system according to a first embodiment.

FIG. 1 is a schematic representation of a molding system 100 (hereafter referred to as the "system 100") according to the first embodiment. Preferably the system 100 is a metal molding system. A method of the system 100 includes determining whether a plug 110 actually blew from a melt passageway 112 of the system 100 into a mold 114. The plug 110 is also commonly called a "thermal plug". The plug 110 may be solidified, but more likely the plug 110 is soft (as in, the plug 110 not 100% solidified). The system 100 includes a controller 102 that is operatively cooperative with the system 100. The controller 102 includes a controller-usable medium 104 embodying instructions 105 that are executable by the controller 102. The instructions 105 include executable instructions for directing the controller 102 to determine whether the plug 110 actually blew from the melt passageway 112 into the mold 114. According to a variant, the instructions 105 are delivered to the controller 102 via a network-transmittable signal 106 that includes a carrier signal modulated to carry the instructions 105. The network-transmittable signal 106 is transmittable over a network, such as the Internet so that the instructions 105 are receivable via an interface 142 of the controller 102. According to another variant, the instructions 105 are delivered to the controller 102 via an article of manufacture 108 that includes a controller-usable medium embodying the instructions 105. The article of manufacture 108 may be a CD (Compact Disk), floppy disk, flash memory, optical disk, etc. Detailed of the instructions 105 are described below. The article of manufacture 108 is interfaced (coupled) to an interface 143 of the controller 102. The interfaces 142, 143 are well known in the art. The controller 102 may include a display unit and/or a keyboard to assist operator (human) interfacing.

Preferably, the system 100 includes an extruder 120 (such as an injection unit). A machine nozzle 122 extends through a stationary platen 124 and connects the extruder 120 to a hot runner 126. The hot runner 126 is mounted to the stationary platen 124. The hot runner 126 is operatively coupled to a stationary side of the mold 114. A movable side of the mold 114 is mounted to a movable platen 128. Tie bars and clamping assemblies are not depicted since they may be conventional and thus well known to those skilled in the art.

A thermal sensor 130 (such as thermocouple) is positioned proximate of the melt passageway 112. The thermal senor 130 is electrically connected (wired) to an interface 140 of the controller 102. A heater 132 is coupled proximate of the melt passageway. The heater 132 is electrically connected (wired) to an interface 141 of the controller 102. Preferably, the thermal sensor 130 and the heater 132 are positioned proximate of a drop 134 of the hot runner 126. According to a variant, the thermal senor 130 is positioned proximate of a cooling structure (not depicted), and the cooling structure is used to form the plug in the melt passageway of the hot runner 126.

Preferably, a dedicated thermal sensor and a dedicated heater are positioned proximate of each drop of the hot runner 126, such as thermal sensor 136, heater 138, and drop 139). The thermal senor 130 is electrically connected (wired) to an interface 145 of the controller 102, while the heater 138 is electrically connected (wired) to an interface 144 of the controller 102.

Preferably, the controller 102 includes a CPU (Central Processing Unit) 150 that is used to execute the instructions 105. A bus 152 operatively connects the CPU 150 with the interfaces 140 to 145, the controller-usable medium 104 and with a database 154.

Figure 2:
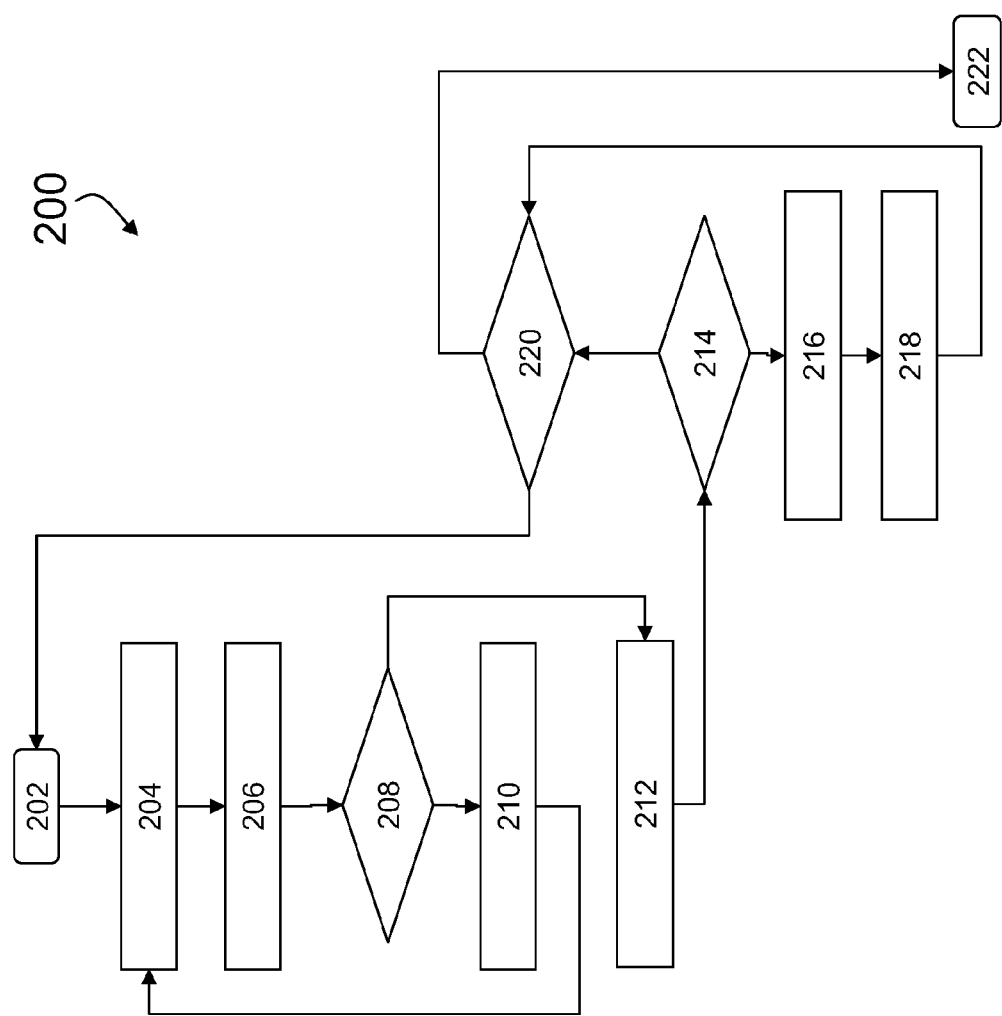
FIG. 2 is a schematic representation of an operation of the molding system of FIG. 1.

FIG. 2 is a schematic representation of an operation 200 of the system 100 of FIG. 1. The operation 200 is coded in programmed statements of the instructions 105 by using a programming language, such as (i) a high-level language (C++ or Java, etc) which is then translated to machine language or (ii) assembly/machine language of a particular processor used in the controller 102. The instructions 105 are executable by the controller 102 of FIG. 1. Operation 202 includes starting of the operation 200 and the control is transferred to operation 204. Operation 204 includes directing the controller 102 to obtain a temperature reading of a thermal sensor (either senor 130 and/or sensor 136 but preferably both). Operation 206 includes directing the controller 102 to determine, after injection pressure has been applied to the plug 110, whether the plug 110 blew from the melt passageway 112 and into the mold 114 (at least partial flow, full flow or no flow). The determination is preferably made or based on a comparison between the temperature of the thermal sensors 130, 136 and a threshold.

Operation 208 includes directing the controller 102 to determine whether to control (adjust the heaters 132, 138) or to annunciate (to a human operator) or both control and annunciate: (i) if it is required to only annunciate, operational control of operation 200 is transferred to operation 210, (ii) if it is required to only control, operational control of operation 200 is transferred to operation 212 and (iii) if it is required to control and to annunciate, operational control of operation 200 is transferred to operation 212 and 210 respectively.

Operation 210 includes directing the controller 102 to annunciate whether the plug 110 blew from the melt passageway 112 and into the mold 114. Operation 212 includes adjusting thermal management (temperature of the heaters 132, 138) of the melt passageway 112 so that the plug 110 may blow in the next injection cycle, based on the determination of whether the plug 110 blew from the melt passageway 112 and into the mold 114 for the current cycle of injection of the system 100.

Operational control is passed over to operation 214 in which: condition (i) an operator may decide to update the database 154, condition (ii) automatic updating of the database 154 occurs, or condition (iii) no updating of the database 154 occurs. If conditions (i) or (ii) are selected, operational control is passed over to operation 216. If condition (iii) is selected, operational control is passed over to operation 220.

Operation 216 includes directing the controller 102 to determine a new threshold based on contents of a database 154, the database 154 indicative of a temperature profile corresponding to types of molding material. Operational control is then passed over to operation 218, which includes determining a new threshold based on contents of a database 154, the database 154 indicative of historical data of temperature profiles corresponding to a type of molding material.

Operation 220 includes directing the controller 102 to determine whether to end the operation 220 or pass on operational control to operation 202.

The instructions 105 include executable instructions for directing the controller 102 to determine whether the plug 110 actually blew (or was blown) from the melt passageway 112 into the mold 114. According to a variant of the system 100, the melt passageway 112 is defined by a drop 134 of hot runner 126, and the hot runner 126 has a plurality of drops. Preferably, the determination of whether the plug 110 actually blew is based on a comparison between a measured temperature of a thermal sensor 130 and a threshold. The instructions 105 for directing the controller 102 may include additional programmed instructions, such as: (i) determining whether the plug 110 actually blew from the melt passageway 112 is based on a comparison between a measured temperature of the thermal senor 130 and a threshold, in which the comparison between the measured temperature and the threshold is an indication of whether at least one of partial-flow condition, full-flow condition, and no-flow condition had occurred, (ii) determining whether the plug 110 actually blew from the melt passageway 112 is based on a comparison between a measured temperature of the thermal sensor 130 and a threshold in which the threshold includes a temperature profile of the melt passageway 112, (iii) determining whether the plug 110 actually blew from the melt passageway 112 is based on a comparison between a measured temperature of the thermal sensor 130 and a threshold, (iv) obtaining a temperature reading of the thermal sensor 130 in which the thermal sensor 130 is operatively connected to the controller 102, (v) adjusting, based on the determination of whether the plug 110 blew from the melt passageway 112, thermal management of the plug 110 disposed in the melt passageway 112 so that the plug 110 may blow from the melt passageway 112 into the mold 114 during a subsequent injection cycle of the system 100, (vi) annunciating whether the plug 110 blew from the melt passageway 112 and into the mold 114, (vii) determining a new threshold based on contents of the database 154 in which the database 154 is indicative of a temperature profile corresponding to types of molding material, (viii) obtaining a temperature reading of the thermal sensor 130 positioned proximate of the plug 110 disposed in the melt passageway 112, and/or (ix) determining, after injection pressure has been applied to the plug 110, whether the plug 110 blew from the passageway based on a comparison between the temperature of the thermal sensor 130 and a threshold.

Figure 3:
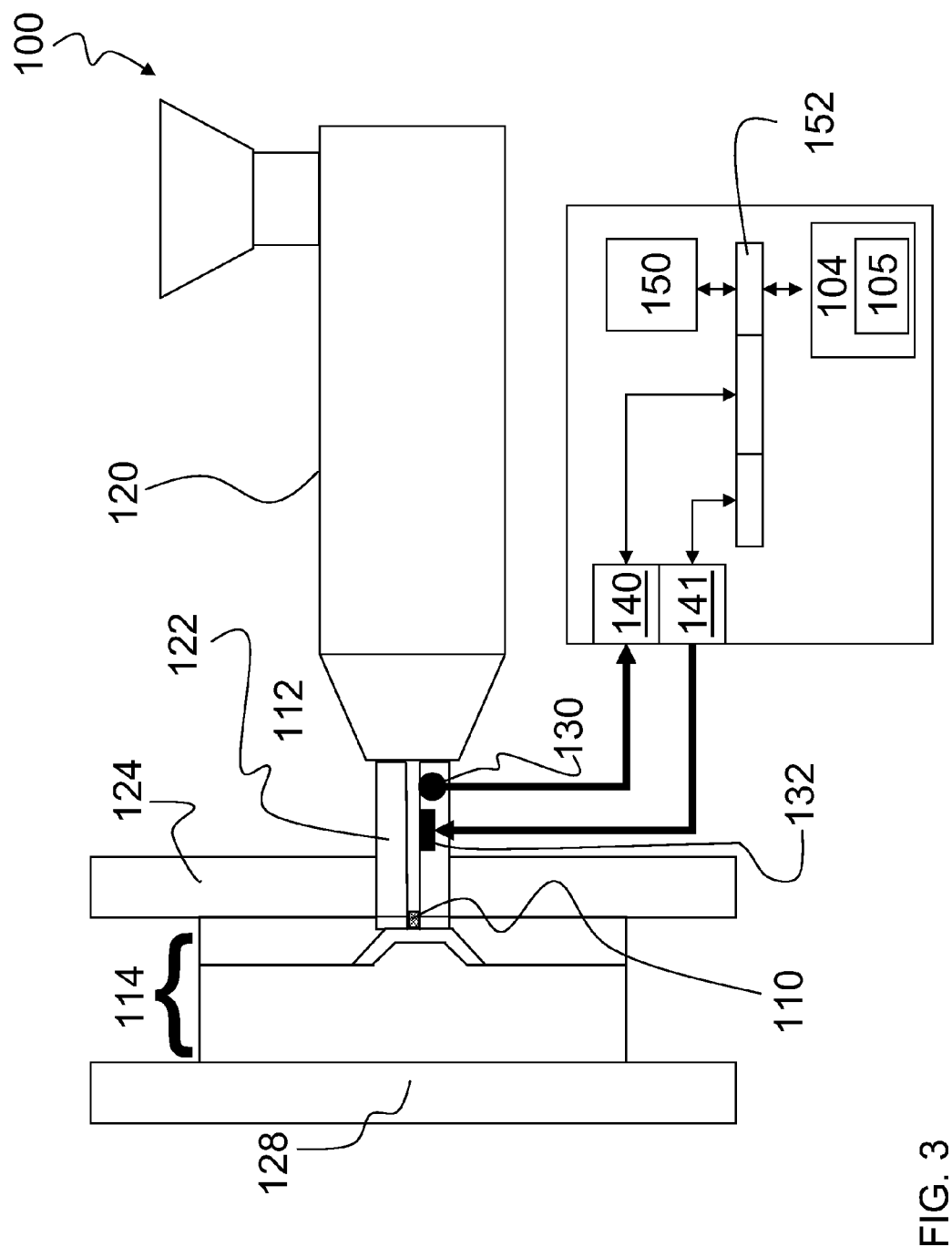
FIG. 3 is a schematic representation of a molding system according to a second exemplary embodiment.

FIG. 3 is a schematic representation of the system 100 according to the second exemplary embodiment, in which a hot runner is not included and the machine nozzle 122 is coupled directly to the mold 114.

Figure 4:
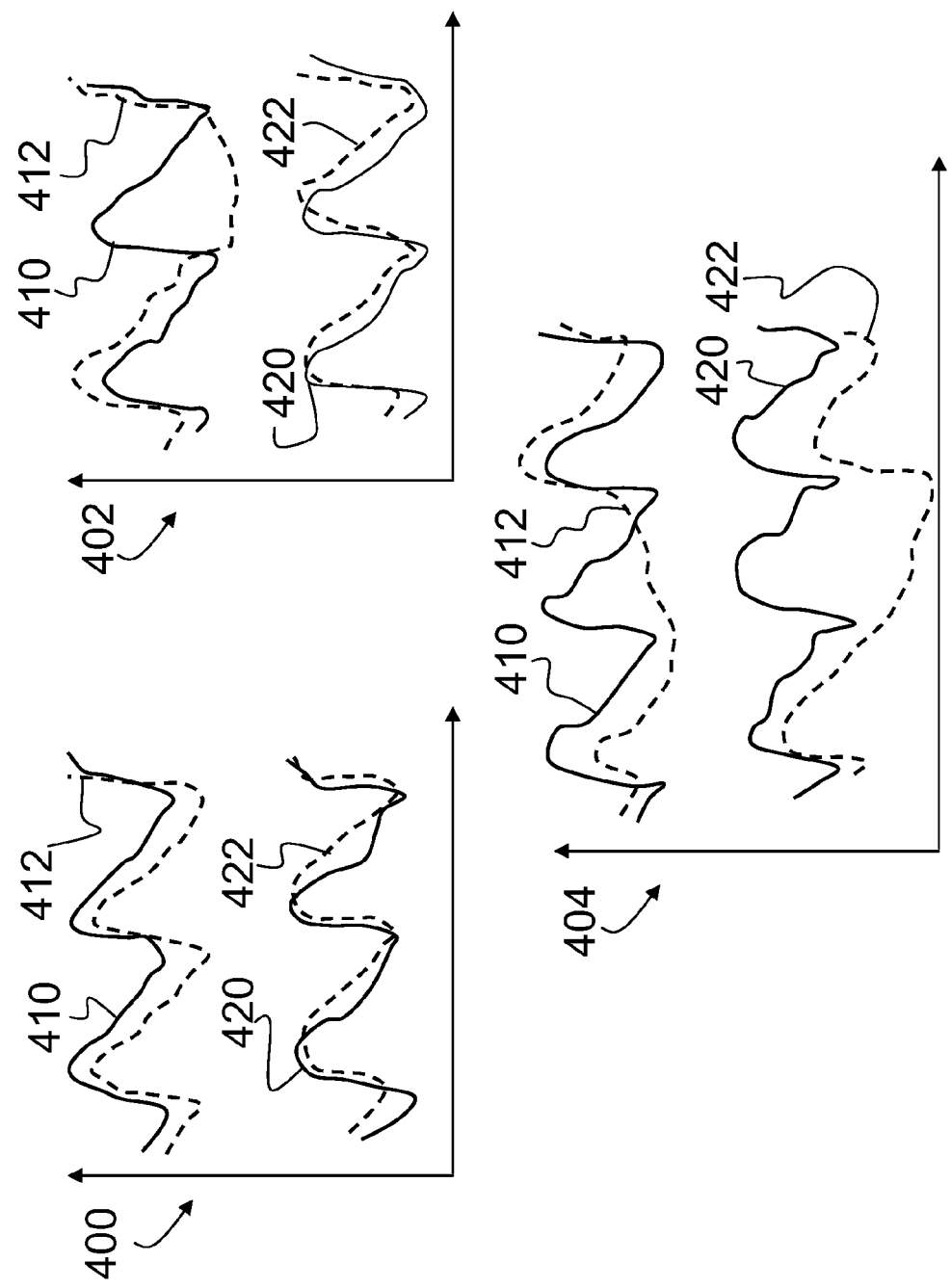
FIG. 4 is a schematic representation of temperature profiles along a passageway of the molding system of FIG. 1.

FIG. 4 is a schematic representative of temperature profiles along the melt passageway 112 of the system 100 of FIG. 1. Three thermal graphs are depicted: (i) thermal graph 400, (ii) thermal graph 402 and (iii) thermal graph 404. For each thermal graph 400, 402, 404, the x-axis is time and the y-axis is temperature. Curves 410, 412 correspond to temperature profiles of respective thermal senors that have been placed in respective drops of a manifold of the hot runner 126 (the drops lead into the mold cavity of the mold 114). Curves 420, 422 correspond to respective temperature profiles of thermal sensors that have been placed proximate of respective cooling structures (such as, cooling rings) that are each placed at respective drops of the hot runner 126. The cooling rings are used to form a plug in the melt passageway 112 (such as in the drop 134 of the hot runner 126).

The thermal graph 400 depicts a contain in which plugs (such as the plug 110) located in respective drops 134 and 139 of the hot runner 126 were blown out. The temperature of the cooling structure varies as a shot of hot molding material is injected into the mold cavity. Just before injection, the temperature is at the most highest point in the temperature profile. Just after the mold cavity becomes filled the temperature is at a lowest point in the temperature profile.

The thermal graph 402 depicts a condition in which one plug was not completely blown out from a drop while the other plug was completely blown out and as a result less flow was realized through that drop.

The thermal graph 404 depicts a condition in which one plug was blown out from a drop while the other plug was not. The profile of the curve 422 indicates that the thermal sensor of a cooling structure has experienced no thermal load (that is, there was no flow of molding material past the cooling structure) and hence there was no increase in temperature for the injection cycle (temperature remained relatively constant). The profile of the curve 412 of the drop (that is associated with the cooling structure that experienced no thermal load) indicates that the thermal sensor of the drop indicates limited thermal load. As a result of back filling the mold cavity, the hot molding material will eventually fill the mold cavity and the temperature of the drop slightly increases as a result.

Figure 5:
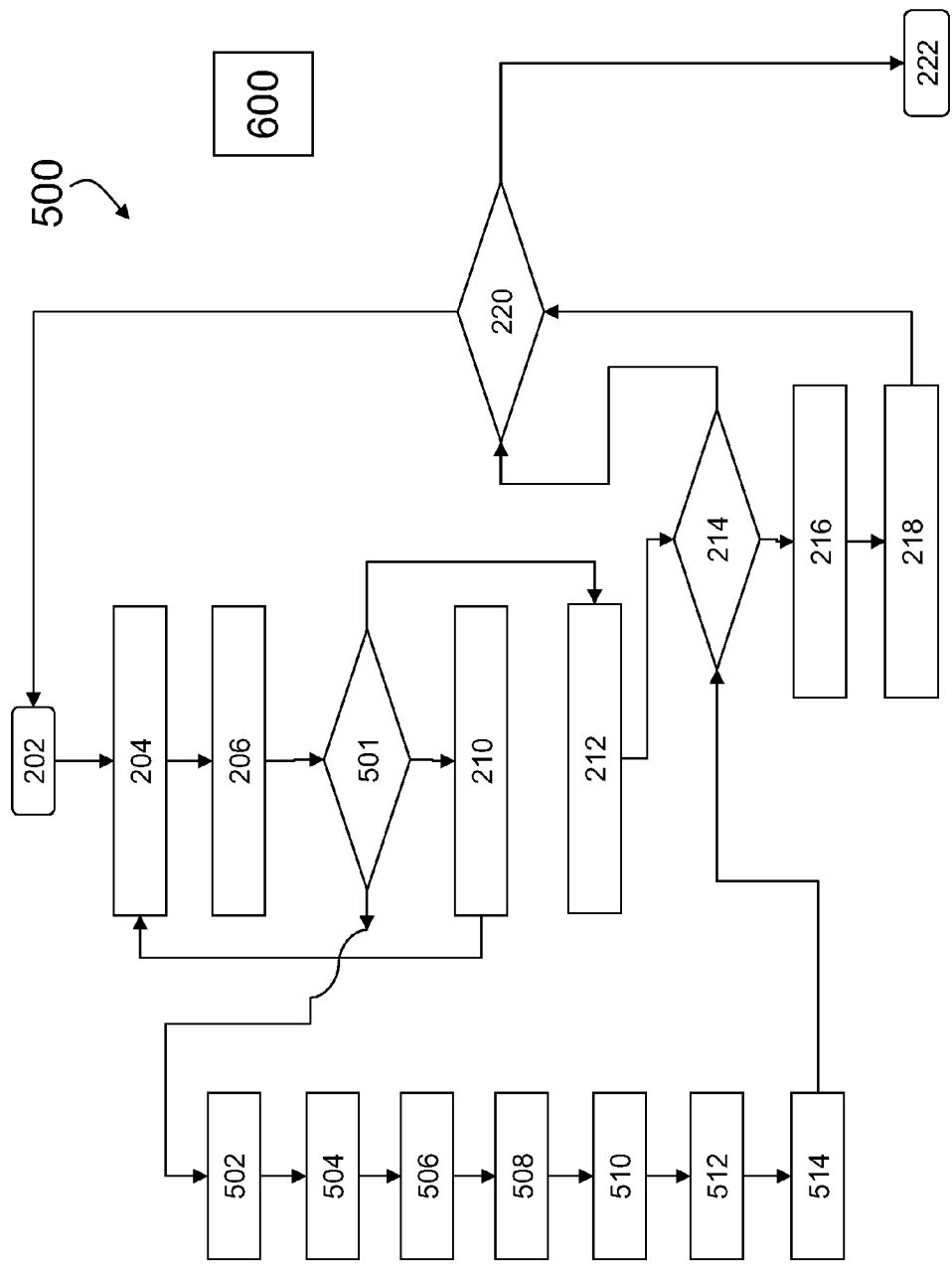
FIG. 5 is a schematic representation of another operation of the molding system of FIG. 1 according to a third exemplary embodiment (which is the preferred embodiment).

FIG. 5 is the schematic representation of an operation 500 of the molding system of FIG. 1 according to the third exemplary embodiment. The operation 500 is coded in programmed statements of the instructions 105 by using a programming language, such as (i) a high-level language (C++ or Java, etc) which is then translated to machine language, or (ii) assembly/machine language of a paricular processor that is used in the controller 102; the instructions 105 are executable by the controller 102 of FIG. 1. Operation 500 (which may also be called a method 500) includes, preferably, operations 501, 502, 504, 506, 508, 510, 512 and/or 514; operations 501 to 514 inclusive are included according to the preferred embodiment. Operation 501 is a modification of the operation 208 (operation 208 is described above in association with FIG. 2). Operation 501 includes directing the controller 102 to determine whether to pass control from operation 206 (which was described in connection to FIG. 2) to: (i) operation 212 (that is, to adjust the heaters 132, 138 accordingly as described above), (ii) operation 210 (that is, to annunciate to a human operator accordingly, as described above), and/or (iii) operation 502. Operation 502 includes directing the controller 102 to identify quality of the molded article 600 that was molded in the mold 114 based on a determination of whether the plug 110 blew, at least in part, from the melt passageway 112 to the mold 114 prior to the molding material entering the mold 114. A technical effect of operation 502 is that the operator of the system 100 would not have to examine each molded article to make a determination of the quality of the molded article, and this arrangement would simplify and/or improve operation of the system 100. Preferably, at least two possible operations may then be performed, such as execution of: (i) operation 504 of identifying whether the molded article 600 has questionable quality if the plug 110 did not blow, and/or (ii) operation 506 that includes identifying whether the molded article 600 has acceptable quality if the plug 110 did blow. Operation 504 may include annunciating that the molded article 600 has questionable quality (such as turning on a red-colored lamp). Operation 506 may include annunciating that the molded article 600 has acceptable quality (such as turning on a green-colored lamp). Preferably the determination of whether the plug 110 blew includes analyzing an output signal of the senor 130 and/or the senor 136 to determine whether the plug 110 blew into the mold 114 once a molding material is injected to the mold 114 from an extruder 120 (this determination is described above in connection with FIGS. 2 and 4); the extruder 120 is operatively coupled to the mold 114, and the extruder 120 was used to prepare the molding material. The sensor 130 and the sensor 136 are positioned proximate to the plug 110 that is waiting to be ejected from the melt passageway 112 to the mold 114. If desired, control may then pass to operation 508 of setting aside the molded article 600 if the plug 110 did not blow; more specifically, operation 508 includes executing: (i) operation 510 of removing the molded article 600 from the mold 114 if the molded article 600 was identified as having questionable quality, and (ii) operation 512 of placing the molded article 600 in a scrap pile. Optionally, operation 510 and operation 512 may be included in operation 512 of directing a robot (not depicted) to remove the molded article 600 from the mold 114 if the molded article 600 was identified as having questionable quality, and (ii) place the molded article 600 in a scrap pile.

The description of the exemplary embodiments provides examples of the present invention, and these examples do not limit the scope of the present invention. It is understood that the scope of the present invention is limited by the claims. The exemplary embodiments described above may be adapted for specific conditions and/or functions, and may be further extended to a variety of other applications that are within the scope of the present invention. Having thus described the exemplary embodiments, it will be apparent that modifications and enhancements are possible without departing from the concepts as described. It is to be understood that the exemplary embodiments illustrate the aspects of the invention. Reference herein to details of the illustrated embodiments is not intended to limit the scope of the claims. The claims themselves recite those features regarded as essential to the present invention. Therefore, what is to be protected by way of letters patent are limited only by the scope of the following claims.

What is claimed is:

1. A method of a molding system being configured to accommodate a mold, comprising:
    an operation of identifying a quality of a molded article that was molded in the mold, the quality of the molded article being based on a determination of whether a plug was blown, at least in part, from a melt passageway leading to the mold as a result of a molding material being made to flow, under pressure, from the melt passageway to the mold, and the molding material pushing the plug into the mold;
    an operation of identifying whether the molded article has a questionable quality if the plug did not blow; an operation of identifying whether the molded article has acceptable quality if the plug did blow; and an operation of analyzing an output signal of a sensor to determine whether the plug had blown, the sensor being positioned proximate to the plug waiting to be ejected from the melt passageway to the mold, the plug becoming ejected to the mold once the molding material is injected to the mold from an extruder, the extruder being operatively coupled to the mold, the extruder being used to prepare the molding material.

2. A controller of a molding system, the molding system being configured to accommodate a mold, the controller comprising:
    a controller-usable medium embodying instructions being executable by the controller, the controller configured to be operatively coupled to the molding system, the instructions including:
        executable instructions for directing the controller to perform an operation of identifying a quality of a folded article that was molded in the mold, the quality of the molded article being based on a determination of whether a plug was blown, at least in part, from a melt passageway leading to the mold as a result of a molding material being made to flow, under pressure, from the melt passageway to the mold, and the molding material pushing the plug into the mold;
        an operation of identifying whether the molded article has a questionable quality if the plug did not blow; an operation of identifying whether the molded article has acceptable quality if the plug did blow; and an operation of analyzing an output signal of a sensor to determine whether the plug had blown, the senor being positioned proximate to the plug waiting to be ejected from the melt passageway to the mold, the plug becoming ejected to the mold once the molding material is injected to the mold from an extruder, the extruder being operatively coupled to the mold, the extruder being used to prepare the molding material.

3. The controller of claim 2, wherein the instructions further include:
    an operation of removing the molded article from the mold if the molded article was identified as having the questionable quality; an operation of placing the molded article in a scrap pile.

4. The controller of claim 2, wherein the instructions further include:
    an operation of directing a robot to perform:
        an operation of removing the molded article from the mold if the molded article was identified as having questionable quality; and
        an operation of placing the molded article in a scrap pile.

5. An article of manufacture of a controller of a molding system, the molding system being configured to accommodate a mold, the article of manufacture comprising:
    a controller-usable medium embodying instructions executable by the controller, the controller operatively coupled to the molding system, the instructions including:
        executable instructions for directing the controller to perform an operation of identifying a quality of a molded article than was molded in the mold, the quality of the molded article being based on a determination of whether a plug was blown, at least in part, from a melt passageway leading to the mold as a result of a molding material being made to flow, under pressure, from the melt passageway to the mold, and the molding material pushing the plug into the mold;
        an operation of identifying whether the molded article has a questionable quality if the plug did not blow; an operation of identifying whether the molded article has acceptable quality if the plug did blew; and an operation of analyzing an output signal of a sensor to determine whether the plug had blown, the sensor being positioned proximate to the plug waiting to be ejected from the melt passageway to the mold, the plug becoming ejected to the mold once the molding material is injected to the mold from an extruder, the extruder being operatively coupled to the mold, the extruder being used to prepare the molding material.

6. The article of manufacture of claim 5, wherein the instructions further includes:
    an operation of removing the molded article from the mold if the molded article was identified as having the questionable quality; an operation of placing the molded article in a scrap pile.

7. The article of manufacture of claim 5, wherein the instructions further include:
    an operation of directing a robot to perform:
        an operation of removing the molded article from the mold if the molded article was identified as having the questionable quality; and
        an operation of placing the molded article in a scrap pile.

8. A molding system being configured to accommodate a mold, comprising:
    a controller, including:
        a controller-usable medium embodying instructions being executable by the controller, the controller operatively coupled to the molding system, the instructions including:
            executable instructions for directing the controller to perform an operation of identifying a quality of a molded article that was molded in the mold, the quality of the molded article being based on a determination of whether a plug was blown, at least in part, from a melt passageway leading to the mold as a result of a molding material being made to flow, under pressure, from the melt passageway to the mold, and the molding material pushing the plug into the mold;
            an operation of identifying whether the molded article has a questionable quality if the plug did not blow; an operation of identifying whether the molded article has acceptable quality if the plug did blow; and an operation of analyzing an output signal of a sensor to determine whether the plug has blown, the sensor being positioned proximate to the plug waiting to be ejected from the melt passageway to the mold, the plug becoming ejected at the mold once the molding material is injected to the mold from an extruder, the extruder being operatively coupled to the mold, the extruder being used to prepare the molding material.

9. The molding system of claim 8, wherein the instructions include:
an operation of removing the molded article from the mold if the molded article was identified as having the questionable quality; an operation of placing the molded article in a scrap pile.

10. The molding system of claim 8, wherein the instructions further include:
an operation of directing a robot to perform:
an operation of removing the molded article from the mold if the molded article was identified as having the questionable quality; and
an operation of placing the molded article in a scrap pile.

11. A method of a metal-molding system, the metal-molding system being configured at accommodate a mold and a hot runner, the hot runner being connected with the mold, the hot runner including drops leading to a mold cavity defined by the mold, the drops being configured to have plugs formed in the drops, the plugs being blowable from the drops to the mold cavity in response to: (i) the plugs receiving a blow-out pressure from the metal-molding system, and (ii) a molding material being made to flow, under pressure, from the metal-molding system to the hot runner and then through the drops and into the mold cavity so that a molded article may be manufactured, the method comprising:
identifying a quality of the molded article that was molded in the mold cavity based on a determination of whether the plugs had blown, at least in part, from the drops of the hot runner into the mold cavity as a result of the molding material being forced, under pressure, to enter the mold cavity;
the determination of whether all of the plugs were blown out from the drops indicates that an optimum flow of the molding material was realized through the drops; the determination of whether a plug was not completely blown out from a drop while another plug was completely blown out from another drop indicates that a flow of the molding material through the drops is less than the optimum flow of the molding material; wherein the hot runner includes thermal sensors being positioned proximate of each of the drops; and the determination of whether all of the plugs were blown out from the drops is based on temperature profiles being associated with the thermal sensors placed at the drops of the hot runner, the temperature profiles being sensed by the thermal sensors.

12. The method of claim 11, wherein:
the hot runner includes:
thermal sensors being positioned proximate of each of the drops; and
cooling structures being placed at the drops of the hot runner, the cooling structures being used to form the plugs in the drops of the hot runner; and
determining whether temperature profiles of the cooling structures had varied as a shot of the molding material was injected into the mold cavity.

13. The method of claim 11, wherein:
the hot runner includes:
thermal sensors being positioned proximate of each of the drops; and
cooling structures being placed at the drops of the hot runner, the cooling structures being used to form the plugs in the drops of the hot runner; and
determining whether temperature profiles of the cooling structures had varied as a shot of the molding material was injected into the mold cavity, includes:
determining temperature profiles of the cooling structures are at a most highest point just before injecting, and
determining the temperature profiles of the cooling structures are at a lowest point just after the mold cavity becomes filled.

14. The method of claim 13, wherein:
determining whether the temperature profiles of the thermal sensors associated with the cooling structures had experienced no thermal load; and
determining, if the no thermal load was determined for a cooling structure even though an injection pressure was applied to the molding material, whether the molding material flowed through a drop being associated with the cooling structure.

* * * * *